United States Patent
Clark et al.

(10) Patent No.: US 8,886,845 B1
(45) Date of Patent: *Nov. 11, 2014

(54) I/O SCHEDULING SYSTEM AND METHOD

(71) Applicant: EMC Corporation, Hopkinton, MA (US)

(72) Inventors: Roy E. Clark, Hopkinton, MA (US); Michel F. Fisher, Natick, MA (US); Humberto Rodriguez, Williamsburg, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,507

(22) Filed: Apr. 2, 2014

Related U.S. Application Data

(63) Continuation of application No. 13/077,863, filed on Mar. 31, 2011, now Pat. No. 8,732,342.

(51) Int. Cl.
*G06F 3/00* (2006.01)
*G06F 9/48* (2006.01)
*G06F 13/16* (2006.01)

(52) U.S. Cl.
CPC .............. *G06F 9/4881* (2013.01); *G06F 13/16* (2013.01)
USPC ........ 710/6; 710/52; 710/57; 710/58; 710/60; 370/229; 370/230; 370/230.1; 370/231; 370/235; 370/236

(58) Field of Classification Search
None
See application file for complete search history.

(56) References Cited

U.S. PATENT DOCUMENTS

| | | | |
|---|---|---|---|
| 6,091,708 A * | 7/2000 | Matsunuma | 370/233 |
| 6,192,422 B1 | 2/2001 | Daines et al. | |
| 6,197,963 B1 | 3/2001 | Hirschmann et al. | |
| 6,636,909 B1 | 10/2003 | Kahn et al. | |
| 7,277,984 B2 | 10/2007 | Ghosal | |
| 7,643,418 B1 | 1/2010 | Varier | |
| 7,751,315 B1 * | 7/2010 | Pai et al. | 370/230 |
| 8,687,483 B2 * | 4/2014 | Hutchison et al. | 370/229 |
| 2003/0229650 A1 | 12/2003 | Olsad et al. | |
| 2004/0133607 A1 | 7/2004 | Miloushev et al. | |
| 2004/0268019 A1 | 12/2004 | Kobayashi et al. | |
| 2005/0273527 A1 | 12/2005 | Olstad et al. | |
| 2006/0004839 A1 | 1/2006 | Nagasawa et al. | |
| 2006/0080353 A1 | 4/2006 | Miloushev et al. | |
| 2007/0174529 A1 | 7/2007 | Rodriguez et al. | |
| 2007/0266053 A1 | 11/2007 | Ahal et al. | |

(Continued)

FOREIGN PATENT DOCUMENTS

JP 02010079536 A 4/2010

OTHER PUBLICATIONS

"HP Smart Array Controller Technology" Technology Brief, Copyright 2010 Hewlett-Packard Development Company, L.P.

*Primary Examiner* — Steven Snyder
(74) *Attorney, Agent, or Firm* — Brian J. Colandreo; Pamela K. Soggu; Holland & Knight LLP

(57) ABSTRACT

A method, computer program product, and computing system for associating a first I/O scheduling queue with a first process accessing a storage network. The first I/O scheduling queue is configured to receive a plurality of first process I/O requests. A second I/O scheduling queue is associated with a second process accessing the storage network. The second I/O scheduling queue is configured to receive a plurality of second process I/O requests.

21 Claims, 4 Drawing Sheets

(56) References Cited

U.S. PATENT DOCUMENTS

| | | |
|---|---|---|
| 2008/0104283 A1 | 5/2008 | Shin et al. |
| 2008/0120463 A1 | 5/2008 | Ashmore |
| 2008/0126374 A1 | 5/2008 | Borthakur et al. |
| 2008/0222311 A1 | 9/2008 | Lee et al. |
| 2009/0240705 A1 | 9/2009 | Miloushev et al. |
| 2009/0292861 A1 | 11/2009 | Kanevsky et al. |
| 2010/0106955 A1 | 4/2010 | Odell |
| 2011/0289261 A1 | 11/2011 | Candelaria |

* cited by examiner

I/O SCHEDULING SYSTEM AND METHOD

RELATED APPLICATIONS

The subject application is a continuation application of U.S. patent application Ser. No. 13/077,863, filed on Mar. 31, 2011, the entire content of which is herein incorporated by reference.

TECHNICAL FIELD

This disclosure relates to I/O systems and, more particularly, to I/O scheduling systems.

BACKGROUND

Operating system I/O schedulers attempt to order and merge I/O requests to increase the overall I/O throughput across a set of devices from a set of concurrent processes. One aspect of some of these schedulers is to introduce a delay to a device in anticipation of additional I/Os that can be ordered and/or merged with previous I/Os. This is especially helpful, in theory, four subsequent workloads were mergable candidates are abundant.

The drawback to this approach is that the delay is typically time-based and does not take into consideration the current load that is already enqueued in the device. Also, in high-process count environments, single device queue algorithms lose potential candidates as the I/Os are spread to far apart.

SUMMARY OF DISCLOSURE

In a first implementation, a method includes associating a first I/O scheduling queue with a first process accessing a storage network. The first I/O scheduling queue is configured to receive a plurality of first process I/O requests. A second I/O scheduling queue is associated with a second process accessing the storage network. The second I/O scheduling queue is configured to receive a plurality of second process I/O requests.

One or more of the following features may be included. First status information concerning the first I/O scheduling queue may be received. The rate at which the first I/O scheduling queue provides the first process I/O requests to the storage network may be regulated. Second status information concerning the second I/O scheduling queue may be received. The rate at which the second I/O scheduling queue provides the second process I/O requests to the storage network may be regulated. Two or more of the first process I/O requests may be combined to form a combined first process I/O request. Two or more of the second process I/O requests may be combined to form a combined second process I/O request.

In another implementation, a computer program product resides on a computer readable medium and has a plurality of instructions stored on it. When executed by a processor, the instructions cause the processor to perform operations including associating a first I/O scheduling queue with a first process accessing a storage network. The first I/O scheduling queue is configured to receive a plurality of first process I/O requests. A second I/O scheduling queue is associated with a second process accessing the storage network. The second I/O scheduling queue is configured to receive a plurality of second process I/O requests.

One or more of the following features may be included. First status information concerning the first I/O scheduling queue may be received. The rate at which the first I/O scheduling queue provides the first process I/O requests to the storage network may be regulated. Second status information concerning the second I/O scheduling queue may be received. The rate at which the second I/O scheduling queue provides the second process I/O requests to the storage network may be regulated. Two or more of the first process I/O requests may be combined to form a combined first process I/O request. Two or more of the second process I/O requests may be combined to form a combined second process I/O request.

In another implementation, a computing system includes at least one processor and at least one memory architecture coupled with the at least one processor.

A first software module is executed on the at least one processor and the at least one memory architecture. The first software module is configured to perform operations including associating a first I/O scheduling queue with a first process accessing a storage network. The first I/O scheduling queue is configured to receive a plurality of first process I/O requests.

A second software module is executed on the at least one processor and the at least one memory architecture. The second software module is configured to perform operations including associating a second I/O scheduling queue with a second process accessing the storage network. The second I/O scheduling queue is configured to receive a plurality of second process I/O requests.

One or more of the following features may be included. First status information concerning the first I/O scheduling queue may be received. The rate at which the first I/O scheduling queue provides the first process I/O requests to the storage network may be regulated. Second status information concerning the second I/O scheduling queue may be received. The rate at which the second I/O scheduling queue provides the second process I/O requests to the storage network may be regulated. Two or more of the first process I/O requests may be combined to form a combined first process I/O request. Two or more of the second process I/O requests may be combined to form a combined second process I/O request.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
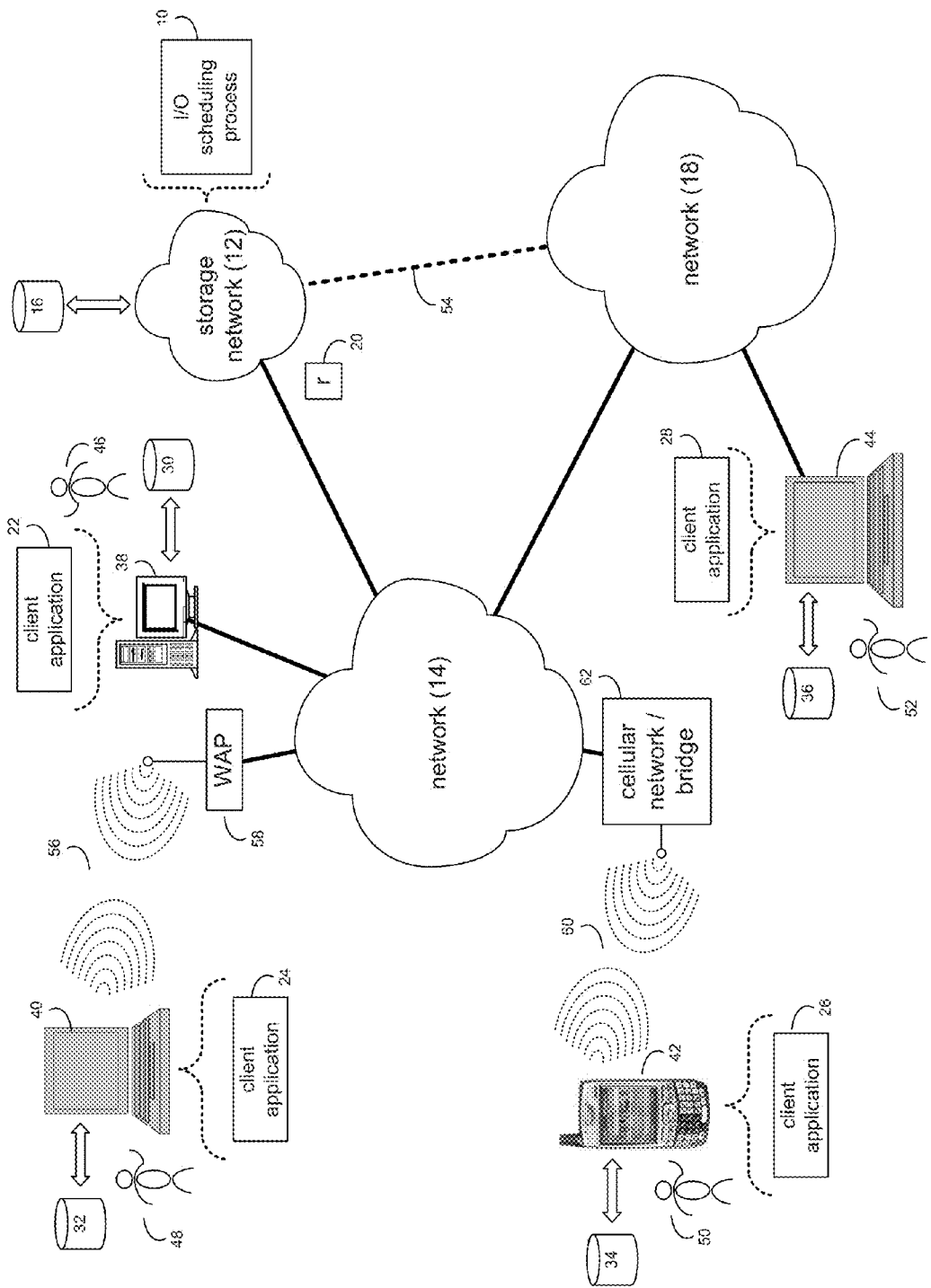
FIG. 1 is a diagrammatic view of a storage network and a I/O scheduling process coupled to a distributed computing network.

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown I/O scheduling process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, I/O scheduling process 10 may associate a first I/O scheduling queue with a first process accessing storage network 12. The first I/O scheduling queue may be configured to receive a plurality of first process I/O requests. I/O scheduling process 10 may associate a second I/O scheduling queue with a second process accessing the storage network. The second I/O scheduling queue may be configured to receive a plurality of second process I/O requests.

The instruction sets and subroutines of I/O scheduling process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); a read-only memory (ROM); and flash memory.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
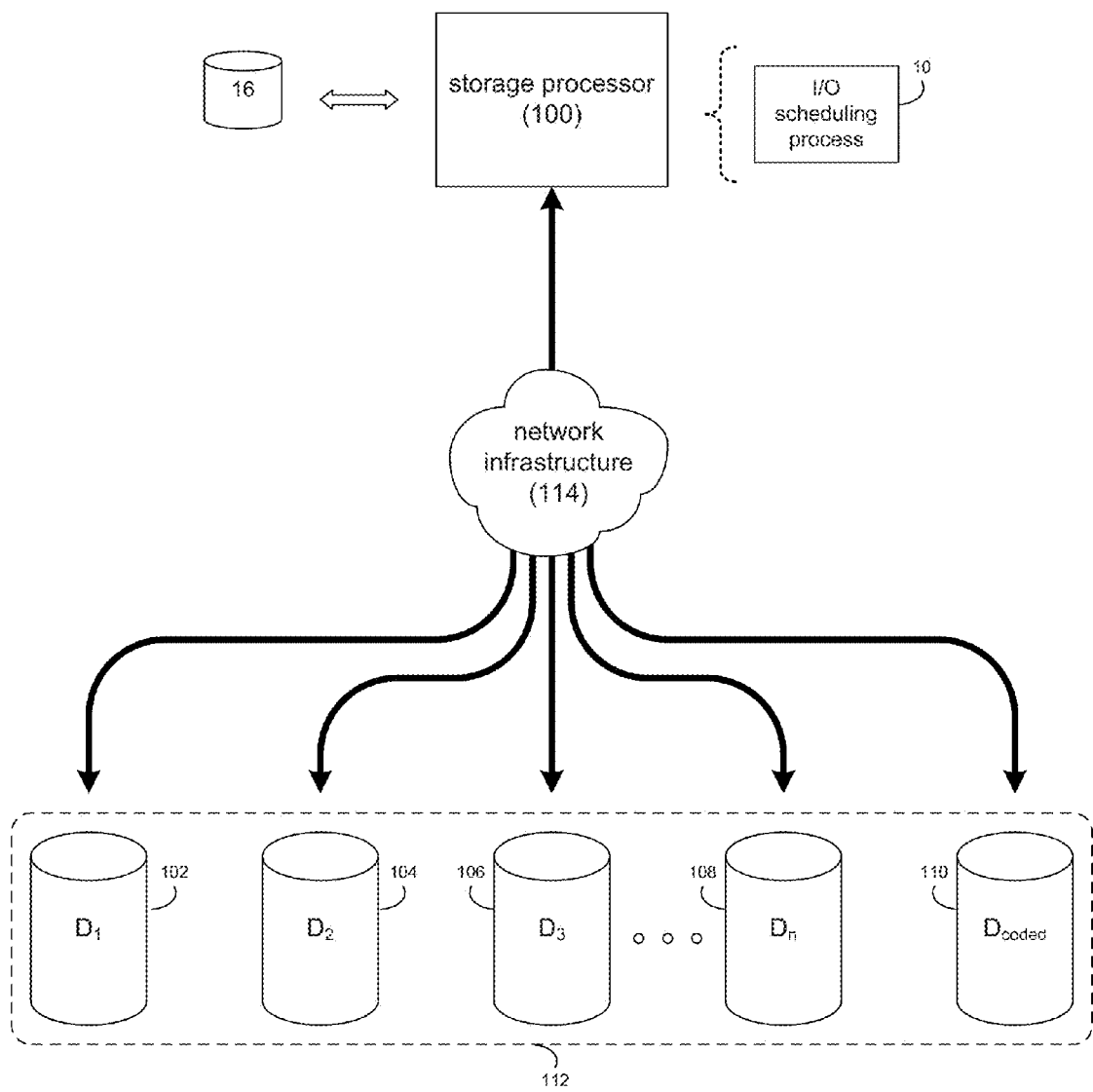
FIG. 2 is a diagrammatic view of the storage network of FIG. 1.

Referring also to FIG. 2, storage network 12 may include at least one storage processor (e.g. storage processor 100), examples of which may include but are not limited the types of storage processors included within the CLARiiON series arrays offered by The EMC Corporation of Hopkinton, Mass. While storage network 12 is shown to include a single storage processor (i.e. storage processor 100), this is for illustrative purposes only and is not intended to be a limitation of this disclosure, as other configurations are possible and are considered to be within the scope of this disclosure. For example, storage network 12 may be configured in a high availability fashion and one or more additional storage processors storage processors (not shown) may be included within storage network 12. In the event that storage network 12 includes a plurality of storage processors, each storage processor may be configured as a hot-swappable field replaceable unit (FRU).

Storage processor 100 may be configured to allow for front-end connectivity to "hosts". Examples of such hosts may include but are not limited to the various computers, servers, and client electronic devices that are connected to e.g. networks 14, 18. A specific example of a "host" is a computer (e.g., computer 38) that is executing a database application in which the database application is configured to store the database information on storage network 12. Additionally, storage processor 100 may be configured to allow for back-end connectivity to various disk arrays, which will be discussed below in greater detail.

The storage processors (e.g. storage processor 100) included within storage network 12 may include cache memory (not shown) that may be segmented into read cache memory (not shown) and write cache memory (not shown). Read cache memory may be used for staging/prefetching data for filling data read requests received from a host and write cache memory may be used to accelerate data write request received from a host.

Storage network 12 may further include a plurality of storage devices $D_{1-n}$ (e.g. storage devices 102, 104, 106, 108). Storage devices 102, 104, 106, 108 may be configured to provide various levels of performance and/or high availability. For example, one or more of storage devices 102, 104, 106, 108 may be configured as a RAID 0 array, in which data is striped across storage devices. By striping data across a plurality of storage devices, improved performance may be realized. However, RAID 0 arrays do not provide a level of high availability. Additionally/alternatively, one or more of storage devices 102, 104, 106, 108 may be configured as a RAID 1 array, in which data is mirrored between storage devices. By mirroring data between storage devices, a level of high availability is achieved as multiple copies of the data are stored within storage network 12.

While in this particular example, storage network 12 is shown to include four storage devices (e.g. storage devices 102, 104, 106, 108), this is for illustrative purposes only and is not intended to be a limitation of this disclosure. Specifically, the actual number of storage devices may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage devices 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage devices 102, 104, 106, 108 and coded target 110 may form non-volatile, memory system 112. Examples of storage devices 102, 104, 106, 108 and coded target 110 included within non-volatile, memory system 112 may include but are not limited to a plurality of electromechanical hard disk drives and/or a plurality of solid-state flash disk drives.

The manner in which storage network 12 is implemented may vary depending upon e.g. the level of redundancy/performance/capacity required. For example, storage network 12 may be a RAID device in which storage processor 100 is a RAID controller card and storage devices 102, 104, 106, 108 and/or coded target 110 are individual "hot-swappable" hard disk drives. An example of such a RAID device may include but is not limited to an NAS device. Alternatively, storage network 12 may be configured as a SAN, in which storage processor 100 may be a dedicated device (e.g., a CLARiiON storage processor) and each of storage devices 102, 104, 106, 108 and/or coded target 110 may be a RAID device.

The various components of storage network 12 (e.g. storage processor 100, storage devices 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The I/O Scheduling Process:

Storage processor 100 may execute all or a portion of I/O scheduling process 10. Additionally, one or more of storage devices 102, 104, 106, 108 and/or coded target 110 may execute all or a portion of I/O scheduling process 10. Further, one or more of client electronic devices 38, 40, 42, 44 may execute all or a portion of I/O scheduling process 10. For example, I/O scheduling process 10 may be a multi-component process that includes e.g., a storage-processor-based component (not shown), a target-based component (not shown), and a client-electronic-device component (not shown).

For example and for illustrative purposes, the storage-processor-based component of I/O scheduling process 10 may be executed on storage processor 100. Further and for illustrative purposes, the target-based component of I/O scheduling process 10 may be executed on each of storage devices 102, 104, 106, 108 and/or coded target 110. Further still and for illustrative purposes, the client-electronic-device component of I/O scheduling process 10 may be executed on one or more of client electronic devices 38, 40, 42, 44. Accordingly, the storage-processor-based component of I/O scheduling process 10, the target-based component(s) of I/O scheduling process 10, and the client-electronic-device component of I/O scheduling process 10 may cooperatively operate to effectuate all of the functionality of I/O scheduling process 10.

The instruction sets and subroutines of the storage-processor-based component of I/O scheduling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); and a read-only memory (ROM).

The instruction sets and subroutines of the target-based component(s) of I/O scheduling process 10, which may be stored on a storage device (not shown) coupled to e.g., each of storage devices 102, 104, 106, 108 and/or coded target 110 may be executed by one or more processors (not shown) and one or more memory architectures (not shown) included within each of storage devices 102, 104, 106, 108 and/or coded target 110. The storage device (not shown) may include but is not limited to: a hard disk drive; a tape drive; an optical drive; a RAID device; a random access memory (RAM); and a read-only memory (ROM).

The instruction sets and subroutines of the client-electronic-device component of I/O scheduling process 10, which may be stored on a storage device coupled to the client electronic device, may be executed by one or more processors (not shown) and one or more memory architectures (not shown) included within the client electronic device. The storage device coupled to the client electronic device may include but is not limited to: a hard disk drive; a tape drive; an optical drive; a RAID device; a random access memory (RAM); and a read-only memory (ROM).

Figure 3:
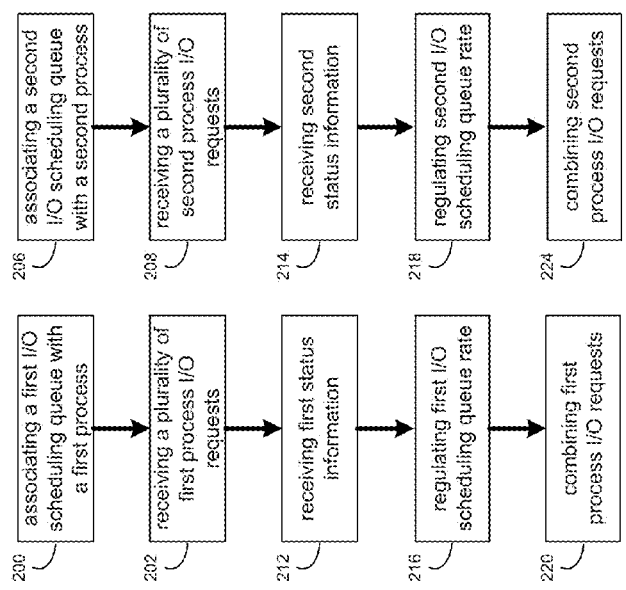
FIG. 3 is a flowchart of the I/O scheduling process of FIG. 1.
Figure 4:
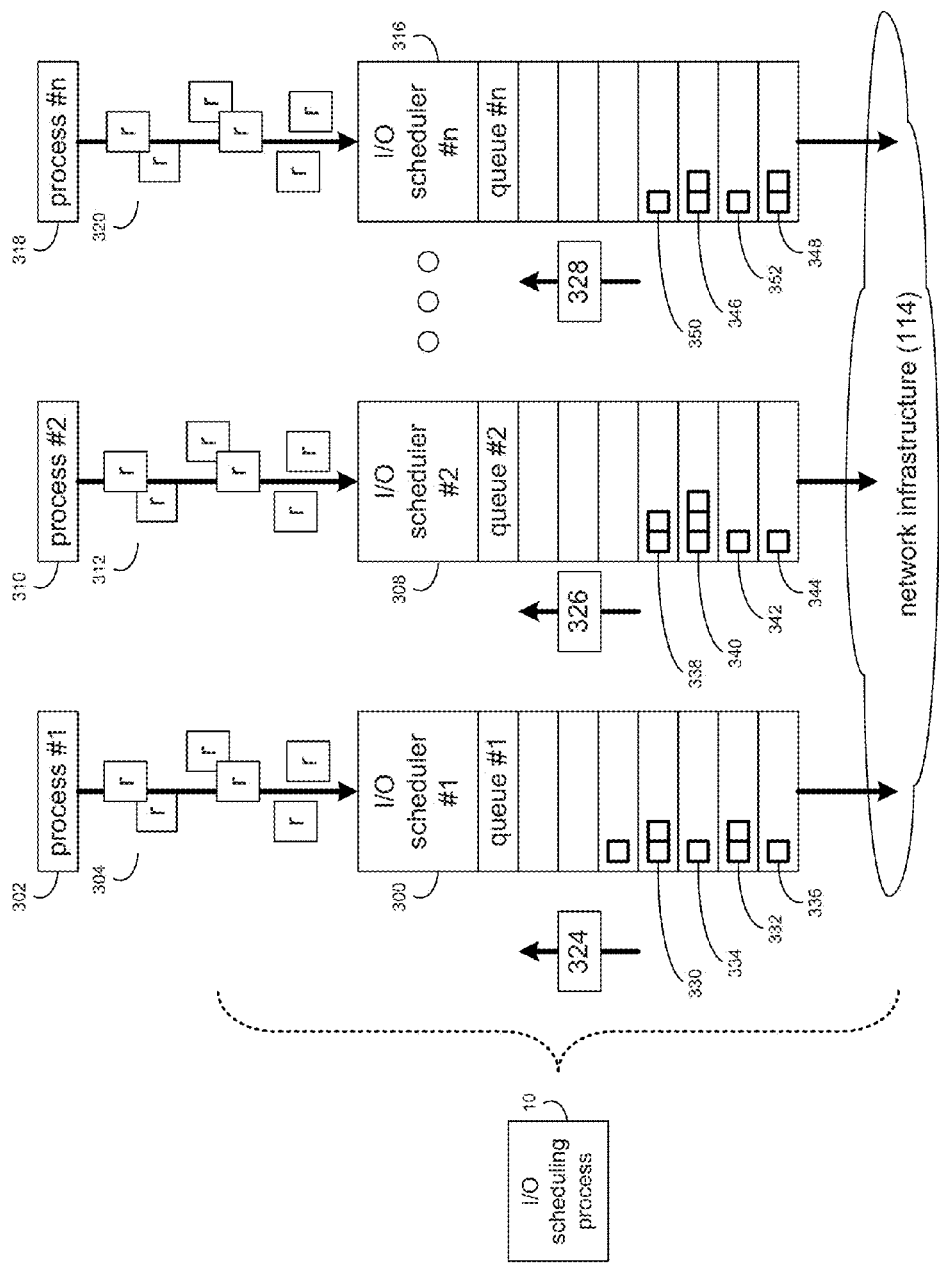
FIG. 4 is a diagrammatic view of scheduling queues controlled by the I/O scheduling process of FIG. 1.

Referring also to FIGS. 3 & 4 and as discussed above, I/O scheduling process 10 may associate 200 a first I/O scheduling queue (e.g., first I/O scheduling queue 300) with a first process (e.g., first process 302) that is accessing data stored within storage network 12. The first I/O scheduling queue (e.g., first I/O scheduling queue 300) may be configured to receive 202 a plurality of first process I/O requests (e.g., first process I/O requests 304).

For example, assume that first process 302 is a database process running on computer 38 that is continuously accessing data stored within storage devices 102, 104, 106, 108 and/or coded target 110. Accordingly, first process I/O requests 304 may include the various data read requests and data write requests that are generated by first process 302 while the user of the database program repeatedly reads database records from storage devices 102, 104, 106, 108 and writes revised database records to storage devices 102, 104, 106, 108.

I/O scheduling process 10 may associate 206 a second I/O scheduling queue (e.g., second I/O scheduling queue 308) with a second process (e.g., second process 310) that is accessing data stored within storage network 12. The second I/O scheduling queue (e.g., second I/O scheduling queue 308) may be configured to receive 208 a plurality of second process I/O requests (e.g., second process I/O requests 312).

For example, assume that second process 310 is a spreadsheet process running on computer 38 that is continuously accessing data stored within storage devices 102, 104, 106, 108 and/or coded target 110. Accordingly, second process I/O requests 312 may include the various data read requests and data write requests that are generated by second process 310 while the user of the spreadsheet program repeatedly reads data cells from storage devices 102, 104, 106, 108 and writes revised data cells to storage devices 102, 104, 106, 108.

While the system as discussed above as including two I/O scheduling queues, this is for illustrative purposes only and is not intended to be a limitation of this disclosure. Accordingly, I/O scheduling process 10 may be configured to define and associate an I/O scheduling queue for each process accessing storage network 12. For example, if one-hundred processes access storage network 12, I/O scheduling process 10 may define and associate a unique I/O scheduling queue for each of these processes. Accordingly, I/O scheduling process 10 may increase (or decrease) the quantity of I/O scheduling queue based upon the number of processes accessing storage network 12.

Accordingly, I/O scheduling process 10 may associate an additional I/O scheduling queue (e.g., I/O scheduling queue 316) with each additional process (e.g., process 318) that is accessing data stored within storage network 12. The additional I/O scheduling queue (e.g., I/O scheduling queue 316) may be configured to receive a plurality of process I/O requests (e.g., process I/O requests 320) associated with e.g., process 318.

In order to enhance efficiency, I/O scheduling process 10 may obtain status information concerning the manner in which storage network 12 is processing the various I/O requests that are being provided from e.g., scheduling queues 300, 308, 316 to storage network 12.

For example, I/O scheduling process 10 may obtain first status information 324 (concerning the manner in which storage network 12 is processing first process I/O requests 304), which may be provided to and received 212 on first I/O scheduling queue 300.

Further, I/O scheduling process 10 may obtain second status information 326 (concerning the manner in which storage network 12 is processing second process I/O requests 312), which may be provided to and received 214 on second I/O scheduling queue 308.

Additionally, I/O scheduling process 10 may obtain additional status information 328 (concerning the manner in which storage network 12 is processing additional process I/O requests 320), which may be provided to and received on additional I/O scheduling queue 316.

Status information 324, 326, 328 may include various pieces of data concerning the manner in which storage network 12 is processing the I/O requests that were provided to it. Examples of such information may include the total quantity (e.g. in megabytes) of I/O requests included within the corresponding queues of storage network 12. For example, there are currently 16 MB of unprocessed I/O requests within storage network 12.

Additionally/alternatively, the information may define the total number of I/O requests included within the corresponding queues of storage network 12. For example, there are currently 32 unprocessed I/O requests within storage network 12.

Additionally/alternatively, the information may define the anticipated latency of the corresponding queues of storage network 12. For example, the I/O requests are taking approximately 30 ms each to process and there are 16 I/O requests currently queued up within storage network 12. Accordingly, it will most likely take 480 ms to process the I/O requests currently included within storage network 12.

Once such status information (e.g. status information 324, 326) is received 212, 214 by the appropriate I/O scheduling queue (e.g. I/O scheduling queue 300, 308), the rate at which I/O requests are provided to storage network 12 may be regulated.

For example, I/O scheduling process 10 may regulate 216 the rate at which first I/O scheduling queue 300 provides first process I/O requests 304 to storage network 12 in response to first status information 324.

Further, I/O scheduling process 10 may regulate 218 the rate at which second I/O scheduling queue 308 provides second process I/O requests 312 to storage network 12 in response to second status information 326.

Additionally, I/O scheduling process 10 may regulate the rate at which additional I/O scheduling queue 316 provides additional process I/O requests 320 to storage network 12 in response to additional status information 328.

Accordingly, in the event that storage network 12 is becoming overly backed up, I/O scheduling process 10 may reduce the rate at which the various I/O requests are being provided to storage network 12.

In order to increase the efficiency of the handling of the I/O requests, the various I/O scheduling queue may try to combine multiple smaller I/O request into a single, larger I/O request. For example, in the event that a first I/O request is writing data to a first logical disk and a second I/O request is reading data from a second logical disk, these disparate I/O requests may typically not be combined. However, in the event that e.g. a first I/O request is writing data to a first logical disk and a second I/O request is writing data to the same logical disk, depending upon the specific portions of the disk to which the data is being written, it may be possible to combine these two I/O requests to form a single larger I/O request.

For example, I/O scheduling process 10 may combine 220 two or more of first process I/O requests 304 to form a combined first process I/O request (e.g. combined first process I/O requests 330, 332), which stand in contrast to those I/O requests that could not be combined (e.g. first process I/O requests 334, 336). I/O scheduling process 10 may provide the combined first process I/O request (e.g. combined first process I/O requests 330, 332) to storage network 12.

Further, I/O scheduling process 10 may combine 224 two or more of second process I/O requests 312 to form a combined second process I/O request (e.g. combined second process I/O requests 338, 340), which stand in contrast to those I/O requests that could not be combined (e.g. second process I/O requests 342, 344). I/O scheduling process 10 may provide the combined second process I/O request (e.g. combined second process I/O requests 338, 340) to storage network 12.

Additionally, I/O scheduling process 10 may combine two or more of additional process I/O requests 320 to form a combined additional process I/O request (e.g. combined additional process I/O requests 346, 348), which stand in contrast to those I/O requests that could not be combined (e.g. additional process I/O requests 350, 352). I/O scheduling process 10 may provide the combined additional process I/O request (e.g. combined second process I/O requests 346, 348) to storage network 12.

Accordingly, by combining 220, 224 discrete I/O requests into larger combined I/O requests, the number of write operations and/or read operations that need to be performed by storage network 12 may be reduced, thus increasing the efficiency of the same. Additionally, as I/O scheduling process 10 is aware (via status information 324, 326, 328) of the status of storage network 12, in the event that a particular queue within storage network 12 is "backlogged" with a substantial number of pending I/O requests, I/O scheduling process 10 may take additional time to try to combine smaller I/O requests into larger I/O requests for the particular queue that is currently "backlogged". Alternatively, if I/O scheduling process 10 (via status information 324, 326, 328) is aware that a particular queue within storage network 12 is running out of pending I/O requests, I/O scheduling process 10 may start passing uncombined (and smaller) I/O request to the particular queue that is currently running out of pending I/O requests, so the same may be processed.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method comprising:
    associating, via one or more computing devices, a first input/output (I/O) scheduling queue with a first process accessing a storage network, wherein the first I/O scheduling queue is configured to receive a plurality of first process I/O requests;
    associating, via the one or more computing devices, a second I/O scheduling queue with a second process accessing the storage network, wherein the second I/O scheduling queue is distinct from the first I/O scheduling queue, wherein the second I/O scheduling queue is configured to receive a plurality of second process I/O requests that are distinct from the plurality of first process I/O requests;
    regulating, via the one or more computing devices, a rate at which the first I/O scheduling queue provides the plurality of first process I/O requests to the storage network; and
    combining, via the one or more computing devices, two or more of the plurality of first process I/O requests to form a combined first process I/O request, wherein one or more of: a number of necessary read operations associated with the first scheduling queue is reduced and a number of necessary write operations associated with the first scheduling queue is reduced.

2. The method of claim 1 further comprising:
    receiving first status information concerning the first I/O scheduling queue.

3. The method of claim 2 wherein the first status information includes one or more of the total size of all I/O requests included within the first I/O scheduling queue, the total number of I/O requests included within the first I/O scheduling queue, and the anticipated latency of the first I/O scheduling queue.

4. The method of claim 1 further comprising:
    receiving second status information concerning the second I/O scheduling queue.

5. The method of claim 1 further comprising:
    regulating a rate at which the second I/O scheduling queue provides the plurality of second process I/O requests to the storage network.

6. The method of claim 1 further comprising:
    combining two or more of the plurality of second process I/O requests to form a combined second process I/O request.

7. The method of claim 1 wherein the second process accessing the storage network is a different type of process than the first process accessing the storage network.

8. A computer program product residing on a non-transitory computer readable medium having a plurality of instructions stored thereon which, when executed by a processor, cause the processor to perform operations comprising:
    associating a first input/output (I/O) scheduling queue with a first process accessing a storage network, wherein the first I/O scheduling queue is configured to receive a plurality of first process I/O requests;
    associating a second I/O scheduling queue with a second process accessing the storage network, wherein the second I/O scheduling queue is distinct from the first I/O scheduling queue, wherein the second I/O scheduling queue is configured to receive a plurality of second process I/O requests that are distinct from the plurality of first process I/O requests;
    regulating a rate at which the first I/O scheduling queue provides the plurality of first process I/O requests to the storage network; and
    combining two or more of the plurality of first process I/O requests to form a combined first process I/O request, wherein one or more of: a number of necessary read operations associated with the first scheduling queue is reduced and a number of necessary write operations associated with the first scheduling queue is reduced.

9. The computer program product of claim 8 further comprising instructions for:
    receiving first status information concerning the first I/O scheduling queue.

10. The computer program product of claim 9 wherein the first status information includes one or more of the total size of all I/O requests included within the first I/O scheduling queue, the total number of I/O requests included within the first I/O scheduling queue, and the anticipated latency of the first I/O scheduling queue.

11. The computer program product of claim 8 further comprising instructions for:
    receiving second status information concerning the second I/O scheduling queue.

12. The computer program product of claim 8 further comprising instructions for:
    regulating a rate at which the second I/O scheduling queue provides the plurality of second process I/O requests to the storage network.

13. The computer program product of claim 8 further comprising instructions for:
    combining two or more of the plurality of second process I/O requests to form a combined second process I/O request.

14. The computer program product of claim 8 wherein the second process accessing the storage network is a different type of process than the first process accessing the storage network.

15. A computing system comprising:
- at least one processor;
- at least one memory architecture coupled with the at least one processor;
- a first software module executed on the at least one processor and the at least one memory architecture, wherein the first software module is configured to perform operations including associating a first input/output (I/O) scheduling queue with a first process accessing a storage network, wherein the first I/O scheduling queue is configured to receive a plurality of first process I/O requests;
- a second software module executed on the at least one processor and the at least one memory architecture, wherein the second software module is configured to perform operations including associating a second I/O scheduling queue with a second process accessing the storage network, wherein the second I/O scheduling queue is distinct from the first I/O scheduling queue, wherein the second I/O scheduling queue is configured to receive a plurality of second process I/O requests that are distinct from the plurality of first process I/O requests;
- a third software module executed on the at least one processor and the at least one memory architecture, wherein the third software module is configured to perform operations including regulating a rate at which the first I/O scheduling queue provides the plurality of first process I/O requests to the storage network; and
- a fourth software module executed on the at least one processor and the at least one memory architecture, wherein the fourth software module is configured to perform operations including combining two or more of the plurality of first process I/O requests to form a combined first process I/O request, wherein one or more of: a number of necessary read operations associated with the first scheduling queue is reduced and a number of necessary write operations associated with the first scheduling queue is reduced.

16. The computing system of claim 15 further comprising a fifth software module executed on the at least one processor and the at least one memory architecture, wherein the fifth software module is configured to perform operations including:
- receiving first status information concerning the first I/O scheduling queue.

17. The computing system of claim 16 wherein the first status information includes one or more of the total size of all I/O requests included within the first I/O scheduling queue, the total number of I/O requests included within the first I/O scheduling queue, and the anticipated latency of the first I/O scheduling queue.

18. The computing system of claim 15 further comprising a sixth software module executed on the at least one processor and the at least one memory architecture, wherein the sixth software module is configured to perform operations including:
- receiving second status information concerning the second I/O scheduling queue.

19. The computing system of claim 15 further comprising a seventh software module executed on the at least one processor and the at least one memory architecture, wherein the seventh software module is configured to perform operations including:
- regulating a rate at which the second I/O scheduling queue provides the plurality of second process I/O requests to the storage network.

20. The computing system of claim 15 further comprising a eighth software module executed on the at least one processor and the at least one memory architecture, wherein the eighth software module is configured to perform operations including:
- combining two or more of the plurality of second process I/O requests to form a combined second process I/O request.

21. The computing system of claim 15 wherein the second process accessing the storage network is a different type of process than the first process accessing the storage network.

\* \* \* \* \*